(12) United States Patent
Yu

(10) Patent No.: US 11,390,284 B2
(45) Date of Patent: Jul. 19, 2022

(54) VEHICLE CONTROLLER, VEHICLE CONTROL METHOD, AND STORAGE MEDIUM

(71) Applicant: HONDA MOTOR CO., LTD., Tokyo (JP)

(72) Inventor: Kaijiang Yu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 16/985,251

(22) Filed: Aug. 5, 2020

(65) Prior Publication Data
US 2021/0039650 A1 Feb. 11, 2021

(30) Foreign Application Priority Data
Aug. 9, 2019 (JP) .............................. JP2019-147946

(51) Int. Cl.
*B60W 30/095* (2012.01)
*B60W 30/18* (2012.01)

(52) U.S. Cl.
CPC .... *B60W 30/18163* (2013.01); *B60W 30/095* (2013.01); *B60W 2552/10* (2020.02); *B60W 2554/406* (2020.02); *B60W 2554/4041* (2020.02); *B60W 2554/4044* (2020.02)

(58) Field of Classification Search
CPC ......... B60W 30/18163; B60W 30/095; B60W 2552/10; B60W 2554/4041; B60W 2554/4044; B60W 2554/406; B60W 2520/10; B60W 2552/53; B60W 2554/4042; B60W 2554/802; B60W 2556/50; B60W 30/18159; B60W 2520/00
See application file for complete search history.

(56) References Cited

FOREIGN PATENT DOCUMENTS

| JP | 2000-052808 | | 2/2000 |
|---|---|---|---|
| JP | 2016146131 A | * | 8/2016 |
| JP | 2017-083950 | | 5/2017 |
| JP | 2019-036339 | | 3/2019 |
| JP | 2019-123449 | | 7/2019 |
| JP | 2020090196 A | * | 6/2020 |

OTHER PUBLICATIONS

English Translation_JP2016146131A (Year: 2016).*
English Translation_JP2020090196A (Year: 2018).*
Japanese Office Action for Japanese Patent Application No. 2019-147946 dated May 31, 2022.

* cited by examiner

*Primary Examiner* — Peter D Nolan
*Assistant Examiner* — Ashley L Redhead, Jr.
(74) *Attorney, Agent, or Firm* — Amin, Turocy & Watson, LLP

(57) ABSTRACT

A vehicle controller includes a first detector configured to detect a traveling state of a host vehicle, a second detector configured to detect a traveling state of an other vehicle that travels along a main lane when the host vehicle travels along a merging road and configured to detect a traffic volume of the main lane, and a merging controller configured to control merging of the host vehicle regardless of a lane changing of the other vehicle when a distance in a forward/rearward direction of the host vehicle with respect to the other vehicle is equal to or greater than a predetermined amount, wherein the merging controller facilitates starting of merging control of the host vehicle when it is detected that a traffic volume of the main lane by the second detector is equal to or greater than a predetermined amount.

5 Claims, 14 Drawing Sheets

VEHICLE CONTROLLER, VEHICLE CONTROL METHOD, AND STORAGE MEDIUM

CROSS-REFERENCE TO RELATED APPLICATION

Priority is claimed on Japanese Patent Application No. 2019-147946, filed Aug. 9, 2019, the content of which is incorporated herein by reference.

BACKGROUND OF THE INVENTION

Field of the Invention

The present invention relates to a vehicle controller, a vehicle control method, and a storage medium.

Description of Related Art

In the related art, a technology of a vehicle traffic management device configured to calculate block sections that are control standards for controlling an intervehicular distance or speeds of vehicles on the basis of a detection result of a road environment and detection results of positions and speeds of the vehicles, and configured to control a plurality of traveling vehicles safely and densely by performing determination of whether to change the traveling lane of the vehicle based on the block sections is disclosed (for example, Japanese Unexamined Patent Application, First Publication No. 2000-52808).

SUMMARY OF THE INVENTION

However, in the technology of the related art, appropriate lane changing may not be performed when traffic in lanes of a merging destination are congested.

An aspect of the present invention is directed to providing a vehicle controller, a vehicle control method, and a program stored in a storage medium that are capable of performing a stable lane changing during traffic congestion.

A vehicle controller, a vehicle control method, and a storage medium according to the present invention employ the following configurations.

(1) A vehicle controller according to an aspect of the present invention includes a first detector configured to detect a traveling state of a host vehicle; a second detector configured to detect a traveling state of an other vehicle that travels along a main lane when the host vehicle travels along a merging road and configured to detect a traffic volume of the main lane; and a merging controller configured to control merging of the host vehicle regardless of a lane changing of the other vehicle when a distance in a forward/rearward direction of the host vehicle with respect to the other vehicle is equal to or greater than a predetermined amount, wherein the merging controller facilitates starting of merging control of the host vehicle when it is detected that a traffic volume of the main lane by the second detector is equal to or greater than a predetermined amount.

(2) In the aspect of the above-mentioned (1), the merging controller may facilitate starting of merging control of the host vehicle when the main lane is constituted by a plurality of lanes and a traffic volume of a first lane of the main lane adjacent to the merging road is equal to or greater than a predetermined amount in comparison with a case in which the main lane is a single lane or a traffic volume of the first lane adjacent to the merging road is less than the predetermined amount.

(3) In the aspect of the above-mentioned (1) or (2), the merging controller may facilitate starting of merging control of the host vehicle when the main lane is constituted by a plurality of lanes and a traffic volume of a first lane of the main lane adjacent to the merging road and a second lane of the main lane adjacent to the first lane is equal to or greater than a predetermined amount in comparison with the case in which the traffic volume of the first lane is less than a predetermined amount.

(4) In the aspect of any one of the above-mentioned (1) to (3), the merging controller may facilitate starting of merging control of the host vehicle when it is detected by the second detector that a plurality of other vehicles that are traveling along the main lane are present and the number of the other vehicles that perform lane changing from the first lane adjacent to the merging road is equal to or greater than the number of the other vehicles that do not perform lane changing from the first lane in comparison with a case in which it is detected by the second detector that a plurality of the other vehicles that are traveling along the main lane are not present or the number of the other vehicles that perform lane changing from the first lane adjacent to the merging road is less than the number of the other vehicles that do not perform lane changing from the first lane.

(5) In the aspect of the above-mentioned (4), the merging controller may facilitate starting of merging control of the host vehicle when a traffic volume of the second lane far from the merging road and adjacent to the first lane is less than a predetermined amount in comparison with a case in which the traffic volume of the second lane is equal to or greater than the predetermined amount.

(6) A vehicle control method according to an aspect of the present invention is performed by a computer, the vehicle control method including: detecting a traveling state of a host vehicle; detecting a traveling state of an other vehicle that travels along a main lane when the host vehicle travels along a merging road and detecting a traffic volume of the main lane; and controlling merging of the host vehicle regardless of lane changing of the other vehicle when a distance in a forward/rearward direction of the host vehicle with respect to the other vehicle is equal to or greater than a predetermined value, wherein starting of merging control of the host vehicle is facilitated when it is detected that a traffic volume of the main lane is equal to or greater than a predetermined amount.

(7) A storage medium according to an aspect of the present invention in which a program is stored is provided, the program configured to cause a computer to: detect a traveling state of a host vehicle; detect a traveling state of an other vehicle that travels along a main lane when the host vehicle travels along a merging road and detect a traffic volume of the main lane; and control merging of the host vehicle regardless of lane changing of the other vehicle when a distance in a forward/rearward direction of the host vehicle with respect to the other vehicle is equal to or greater than a predetermined value, wherein starting of merging control of the host vehicle is facilitated when it is detected that a traffic volume of the main lane is equal to or greater than a predetermined amount.

According to the aspect of the above-mentioned (1) to (7), stable lane changing can be performed even upon traffic congestion.

DETAILED DESCRIPTION OF THE INVENTION

Hereinafter, embodiments of a vehicle controller, a vehicle control method, and a program of the present invention will be described with reference to the accompanying drawings. Further, the vehicle controller of the embodiment is applied to an automated driving vehicle. The automated driving is, for example, controlling both of steering and acceleration of the vehicle to execute driving control. The vehicle controller of the embodiment may be applied to the vehicle that performs driving assistance such as an adaptive cruise control system (ACC), a lane keeping assistance system (LKAS), or the like.

Entire Configuration

Figure 1:
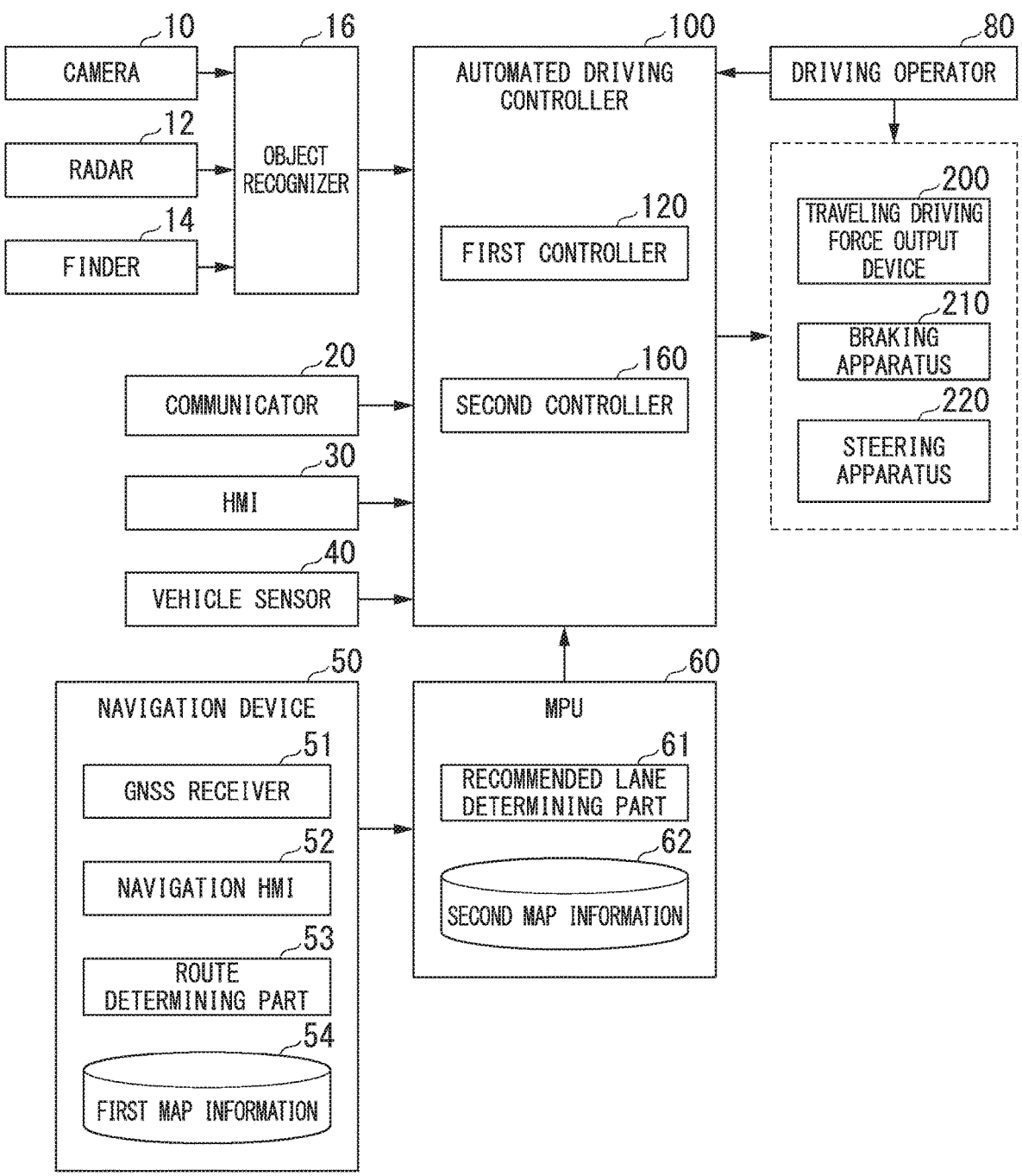
FIG. 1 is a configuration view of a vehicle system using a vehicle controller of a first embodiment.

FIG. 1 is a configuration view of a vehicle system 1 using a vehicle controller 100 of a first embodiment. A vehicle on which the vehicle system 1 is mounted is, for example, a two-wheeled, three-wheeled or four-wheeled vehicle, and a driving source thereof is an internal combustion engine such as a diesel engine, a gasoline engine, or the like, an electric motor, or a combination thereof. The electric motor is operated using an output generated from a generator connected to the internal combustion engine, or an output discharged from a secondary battery or a fuel cell.

The vehicle system 1 includes, for example, a camera 10, a radar 12, a finder 14, an object recognizer 16, a driving operator 80, the vehicle controller 100, a traveling driving force output device 200, a braking apparatus 210 and a steering apparatus 220. These devices or mechanisms are connected to each other by a multiple communication line such as a controller area network (CAN) communication line or the like, a serial communication line, a wireless communication line, or the like. Further, the configuration shown in FIG. 1 is merely an example, and a part of the configuration may be omitted, and other components may be added thereto.

The camera 10 is a digital camera using a solid-state image sensing device such as a charge coupled device (CCD), a complementary metal oxide semiconductor (CMOS), or the like. The camera 10 is attached to an arbitrary place of the vehicle (hereinafter, a host vehicle M) in which the vehicle system 1 is mounted. When a side in front of the vehicle is imaged, the camera 10 is attached to an upper section of a front windshield, a back surface of a rearview mirror, or the like. For example, the camera 10 images the surroundings of the host vehicle M periodically repeatedly. The camera 10 may be a stereo camera.

The radar 12 detects radio waves reflected by an object (reflected waves) to detect at least a position (a distance and an azimuth) of an object while radio waves such as millimeter waves or the like are radiated to the surroundings of the host vehicle M. The radar 12 is attached to an arbitrary place of the host vehicle M. The radar 12 may detect a position and a speed of an object using a frequency modulated continuous wave (FM-CW) method.

The finder 14 is a light detection and ranging (LIDAR) device. The finder 14 radiates light to surroundings of the host vehicle M and measures scattered light. The finder 14 detects a distance to an object on the basis of a time from light emission to light reception. The radiated light is, for example, pulse-form laser light. The finder 14 is attached to an arbitrary place of the host vehicle M.

The object recognizer 16 recognizes a position, a type, a speed, or the like, of the object by performing sensor fusion processing with respect to a detection result using some or all of the camera 10, the radar 12, and the finder 14. The object recognizer 16 outputs the recognition result to the vehicle controller 100. The object recognizer 16 may output detection results of the camera 10, the radar 12, and the finder 14 to the vehicle controller 100 as they are. The object recognizer 16 may be omitted from the vehicle system 1.

A communicator 20 communicates with another vehicle present around an automated driving vehicle using, for example, a cellular network, a Wi-Fi network, Bluetooth (Registered mark), dedicated short range communication (DSRC), or the like, or communicates with various server devices that provide traffic information (for example, road congestion information, setting information of a priority route/a priority lane due to adjustment of a traffic volume, passage of an emergency vehicle, or the like) via a radio base station or the like.

An HMI 30 receives inputs of operations of an occupant in the automated driving vehicle while providing various pieces of information to the occupant. The HMI 30 may include display devices, speakers, buzzers, touch panels, switches, keys, and the like, of various types.

Vehicle sensors 40 include a vehicle speed sensor configured to detect a speed of the automated driving vehicle, an acceleration sensor configured to detect an acceleration, a yaw rate sensor configured to detect an angular speed around a vertical axis, an azimuth sensor configured to detect an orientation of the automated driving vehicle, and the like.

A navigation device 50 includes, for example, a global navigation satellite system (GNSS) receiver 51, a navigation HMI 52 and a route determining part 53. The navigation device 50 stores first map information 54 in a storage such as a hard disk drive (HDD), a flash memory, or the like. The GNSS receiver 51 identifies a position of the automated driving vehicle on the basis of a signal received from GNSS satellites. The position of the automated driving vehicle may be specified or complemented by an initial navigation system (INS) using the output from the vehicle sensors 40. The navigation HMI 52 includes a display device, a speaker, a touch panel, a key, and the like. The navigation HMI 52 may be partially or entirely shared by the above-mentioned HMI 30. For example, the route determining part 53 determines a route (hereinafter, a route on a map) to a destination input by the occupant using the navigation HMI 52 from a position (or an input arbitrary position) of the automated driving vehicle specified by the GNSS receiver 51 with reference to the first map information 54. For example, the first map information 54 is information in which a road shape is expressed by a link showing a road and nodes connected by the link. The first map information 54 may include a curvature of a road, point of interest (POI) information, or the like. The route on a map is output to an MPU 60. The navigation device 50 may perform route guidance using the navigation HMI 52 on the basis of the route on a map. The navigation device 50 may be realized by a function of a terminal device, for example, a smartphone, a tablet terminal, or the like, possessed by the occupant. The navigation device 50 may transmit a current location and a destination to a navigation server via the communicator 20, and may acquire an equivalent route as the route on a map from the navigation server.

The MPU 60 includes, for example, a recommended lane determination part 61, and holds second map information 62 in a storage such as an HDD, a flash memory, or the like. The recommended lane determination part 61 divides the route on a map provided from the navigation device 50 into a plurality of blocks (for example, dividing at every 100 [m] in a vehicle advancing direction), and determines a recommended lane at each block with reference to the second map information 62. The recommended lane determination part 61 determines the number of the lane from the left on which the automated driving vehicle will travel. The recommended lane determination part 61 determines a recommended lane such that the automated driving vehicle can travel on a reasonable route to advance to a branch destination when a diverging point is present in the route on a map.

The second map information 62 is map information that is more accurate than the first map information 54. The second map information 62 includes, for example, information of a center of a lane, information of boundaries of a lane, or the like. In addition, the second map information 62 may include road information, traffic regulations information, address information (address/zip code), facility information, telephone number information, and the like. The second map information 62 may be updated at any time when the communicator 20 communicates with another device.

The driving operators 80 include, for example, an accelerator pedal, a brake pedal, a shift lever, a steering wheel, a modified steer, a joystick, and other operators. A sensor configured to detect an operation amount or an existence of an operation is attached to the driving operator 80, and a detection result thereof is output to some or all of the vehicle controller 100, the traveling driving force output device 200, the braking apparatus 210 and the steering apparatus 220.

The vehicle controller 100 includes, for example, a first controller 120 and a second controller 160. Each of the first controller 120 and the second controller 160 is realized by executing a program (software) using a hardware processor such as a central processing unit (CPU) or the like. In addition, some or all of these components may be realized by hardware (a circuit part; including circuitry) such as a large scale integration (LSI), an application specific integrated circuit (ASIC), a field-programmable gate array (FPGA), a graphics processing unit (GPU), or the like, or may be realized by cooperation between software and hardware. The program may be previously stored in a storage such as an HDD, a flash memory, or the like, of the vehicle controller 100 (a storage including a non-transient storage medium), stored in a detachable storage medium such as a DVD, a CD-ROM, or the like, or installed in an HDD or a flash memory of the vehicle controller 100 by mounting the storage medium (the non-transient storage medium) on a drive device.

Figure 2:
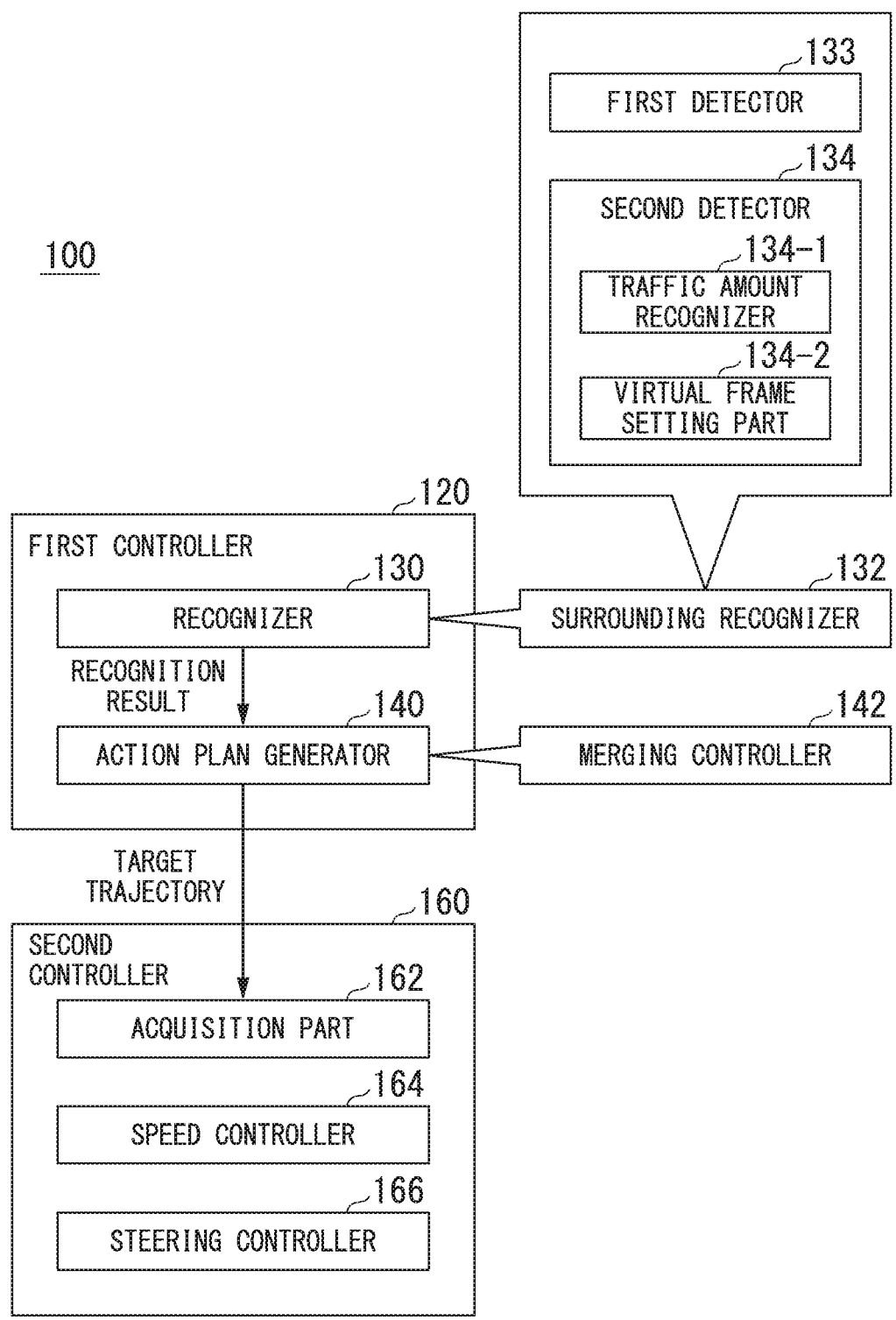
FIG. 2 is a functional configuration view of a first controller and a second controller.

FIG. 2 is a functional configuration view of the first controller 120 and the second controller 160. The first controller 120 includes, for example, a recognizer 130 and an action plan generator 140. For example, the first controller 120 may realize both of a function of artificial intelligence (AI) and a function of a previously provided model at the same time. For example, regarding a function of "recognizing a crossroad", recognition of a crossroad through deep learning or the like and recognition based on a predetermined condition (a signal, road markings, or the like that are able to be detected by pattern matching) may be executed in parallel, and the function of "recognizing a crossroad" may be realized by scoring and comprehensively evaluating them. Accordingly, reliability of automated driving is guaranteed.

The recognizer 130 recognizes surroundings of the host vehicle M, and estimates behaviors of recognized target objects. The recognizer 130 includes, for example, a surrounding recognizer 132.

The surrounding recognizer 132 recognizes a state such as a position, a speed, an acceleration, or the like, of an object (a preceding vehicle, an oncoming vehicle, a main lane vehicle that travels along a main lane of a merging road, or the like) present around the automated driving vehicle on the basis of the information input from the camera 10, the radar 12, and the finder 14 via the object recognizer 16. For example, the position of the object is recognized as a position on absolute coordinates using a representative point (a center of gravity, a driving axial center, or the like) of the automated driving vehicle as an origin, and used for control. The position of the object may be displayed at a representative point such as a center of gravity, a corner, or the like, of the object, or may be displayed as a representative region. The "state" of the object may include an acceleration, a jerk, or "an action state" (for example, whether a lane change by the preceding vehicle of the host vehicle M is being performed or a lane change is planned to be performed) of the object.

The surrounding recognizer 132 recognizes a position and an attitude of the automated driving vehicle with respect to a traveling lane when the traveling lane is recognized. The surrounding recognizer 132 may recognize, for example, a separation of a reference point of the automated driving vehicle from a lane center and an angle with respect to a line that connects centers of lanes in a direction of advancement of the automated driving vehicle as a relative position and an attitude of the automated driving vehicle with respect to the traveling lane. Instead of this, the surrounding recognizer 132 may recognize a position or the like of a reference point of the automated driving vehicle with respect to any side end portion (a road marking line or a road boundary) of the traveling lane as a relative position of the automated driving vehicle with respect to the traveling lane.

The surrounding recognizer 132 recognizes, for example, a lane in which the automated driving vehicle is traveling (a traveling lane). For example, the surrounding recognizer 132 recognizes a traveling lane by comparing a pattern (for example, arrangement of solid lines and broken lines) of road marking lines obtained from the second map information 62 with a pattern of road marking lines around the automated driving vehicle recognized from an image captured by the camera 10. Further, the surrounding recognizer 132 may recognize a traveling lane by recognizing course boundaries (road boundaries) including road marking lines, road shoulders, curbstones, median strips, guardrails, and the like, while not being limited to road marking lines. In the recognition, a position of the automated driving vehicle acquired from the navigation device 50 or a processing result by the INS may be added. In addition, the surrounding recognizer 132 recognizes a temporary stop line, a traffic signal, and other road events.

The surrounding recognizer 132 recognizes information related to surrounding vehicles, in particular, a roadway along which the host vehicle M is planned to travel, on the basis of the vehicles around the host vehicle M recognized from an image captured by the camera 10, an image captured by the camera 10, congestion information around the host vehicle M acquired by the navigation device 50, or positional information obtained from the second map information 62. The information related to the roadway planned to travel includes, for example, a width of a lane (a width of a road) along which the host vehicle M is planned to travel.

The surrounding recognizer 132 includes, for example, a first detector 133 and a second detector 134.

The first detector 133 detects a traveling state of the host vehicle M on the basis of the recognition result of the surrounding recognizer 132. The first detector 133 detects a traveling state such as a traveling position, a speed, an angular speed, or the like, of the host vehicle M when the host vehicle M travels on a merging road. In addition, the first detector 133 detects a traffic congestion state of a merging road (whether the traffic is jammed) when the host vehicle M travels along the merging road).

The second detector 134 detects a traveling state of another vehicle (hereinafter, main lane vehicles mN; N is a number of the traveling lane, and when a plurality of vehicles are present in the lane L1, a main lane vehicle m11, a main lane vehicle m12, a main lane vehicle m13 . . . are shown) that travels on a main lane, which is a merging destination of the host vehicle M, when the host vehicle M is traveling on the merging road on the basis of the recognition result of the surrounding recognizer 132. The second detector 134 detects a traveling state, for example, whether a main lane vehicle m1 is present, a traveling position, a speed, an angular speed, a vehicle length, or the like, of the main lane vehicle m1. In addition, the second detector 134 detects a transverse moving situation of the main lane vehicle m1, and detects whether the main lane vehicle m1 continuously travels on the lane in which the main lane vehicle m1 is traveling or is going to change a lane from the lane in which the main lane vehicle m1 is traveling.

The second detector 134 includes, for example, a traffic volume recognizer 134-1 and a virtual frame setting part 134-2.

The traffic volume recognizer 134-1 recognizes a traffic volume of each lane included in the main lane, and recognizes whether the main lane is in a traffic congested state. The traffic volume recognizer 134-1 recognizes whether the main lane is in traffic congested state on the basis of whether a traffic volume of the lane is a predetermined amount or more. "The traffic volume is the predetermined amount or more" may be, for example, as being determined on the basis of traffic information provided by the navigation device 50 or the like, or being determined on the basis of the number or traveling positions of the vehicles around the host vehicle M among the recognition results of the surrounding recognizer 132.

The virtual frame setting part 134-2 sets a virtual frame including a reference place of the vehicle with respect to each main lane vehicle on the basis of the recognition result by the traffic volume recognizer 134-1. The virtual frame is set to include an outline of the vehicle, for example, when the vehicle that is traveling straight is seen from a plan view or a side view. The virtual frame setting part 134-2 will be described below in detail.

The action plan generator 140 generates a target trajectory along which the host vehicle M is planned to travel in the future such that the host vehicle M travels on a recommended lane determined by the recommended lane determination part 61 in principal, and further, automated driving is performed to correspond to a surrounding situation of the host vehicle M. The target trajectory includes, for example, a speed element. For example, the target trajectory is expressed as points at which the host vehicle M should arrive (trajectory points) arranged in sequence. The trajectory point is a point at which the host vehicle M should arrive at each of predetermined traveling distances (for example, about every several [m]) as a road distance, and separately from this, a target speed and a target acceleration of each predetermined sampling period (for example, every several fractions of a [sec]) are generated as a part of the target trajectory.

The action plan generator 140 may set an event of automated driving also when generating a target trajectory. An event of automated driving includes, for example, a fixed speed traveling event, a low speed following traveling event, a lane change event, a branching-off event, a contact avoiding event, a merging event, or the like. The merging event is an event of merging the host vehicle M with a main lane at a merging point having no signal or stop line, for example, at an expressway or the like. The action plan generator 140 generates a target trajectory according to the started event.

The action plan generator 140 includes, for example, a merging controller 142. The functions of the merging controller 142 will be described below in detail.

The second controller 160 controls the traveling driving force output device 200, the braking apparatus 210, and the steering apparatus 220 such that the automated driving vehicle passes through the target trajectory generated by the action plan generator 140 at the scheduled time.

Returning to FIG. 1, the second controller 160 includes, for example, an acquisition part 162, a speed controller 164 and a steering controller 166. The acquisition part 162 acquires information of the target trajectory (the trajectory point) generated by the action plan generator 140, and stores the information in the memory (not shown). The speed controller 164 controls the traveling driving force output device 200 or the braking apparatus 210 on the basis of a speed element accompanying the target trajectory stored in the memory. The steering controller 166 controls the steering apparatus 220 according to a curve condition of the target trajectory stored in the memory. Processing of the speed controller 164 and the steering controller 166 are realized by, for example, a combination of feedforward control and feedback control. As an example, the steering controller 166 combines feedforward control according to a curvature of the road in front of the automated driving vehicle and feedback control on the basis of a separation from the target trajectory and executes them.

The traveling driving force output device 200 outputs a traveling driving force (torque) that causes the vehicle to travel to a driving wheel. The traveling driving force output device 200 includes, for example, an electronic control unit (ECU) configured to control an internal combustion engine, an electric motor, a gear box, and the like, when they are combined. The ECU controls these components according to the information input from the second controller 160 or the information input from the driving operator 80.

The braking apparatus 210 includes, for example, a brake caliper, a cylinder configured to transmit a hydraulic pressure to the brake caliper, an electric motor configured to generate a hydraulic pressure in the cylinder, and a brake ECU. The brake ECU controls the electric motor according to the information input from the second controller 160 or the information input from the driving operator 80 such that a braking torque is output to each wheel according to a braking operation. The braking apparatus 210 may include a mechanism configured to transmit a hydraulic pressure generated according to an operation of a brake pedal included in the driving operator 80 to the cylinder via a master cylinder as a back-up. Further, the braking apparatus 210 is not limited to the above-mentioned configuration and may be an electronically controlled hydraulic braking apparatus configured to control an actuator according to the information input from the second controller 160 and transmit a hydraulic pressure of the master cylinder to the cylinder.

The steering apparatus 220 includes, for example, a steering ECU and an electric motor. The electric motor changes, for example, an orientation of a steered wheel by applying a force to a rack and pinion mechanism. The steering ECU drives the electric motor and changes an orientation of the steered wheel according to the information input from the second controller 160 or the information input from the driving operator 80.

Function of Merging Controller

Hereinafter, a function of the merging controller 142 will be described in detail. Further, the function of the merging controller 142 described below may be a function executed according to the merging event or may be a function in the other merging control.

Merging Control when Main Lane is Single Lane

Hereinafter, in the order the scene progresses, processing of the first detector 133, the second detector 134, and the merging controller 142 will be described with reference to FIG. 3 and FIG. 4.

Figure 3:
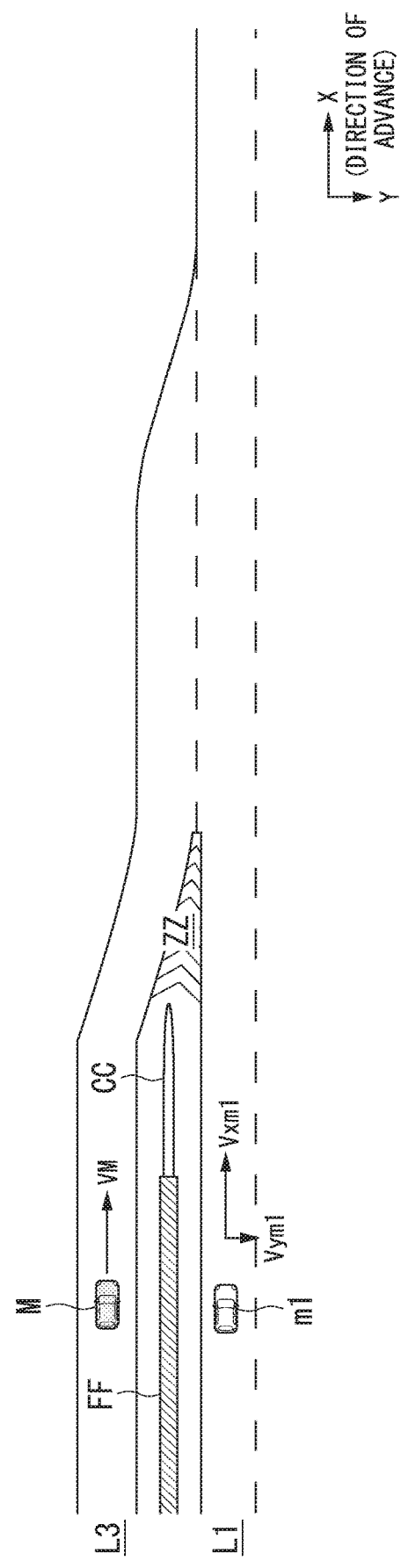
FIG. 3 is a view showing a first scene.

FIG. 3 is a view showing a first scene. The first scene is a situation before the merging control is started. In the first scene, the host vehicle M travels along the lane L3 that merges with the lane L1 that is the main lane. Another vehicle (hereinafter, the main lane vehicle m1) is traveling along the lane L1 that is the main lane. It is assumed that a stop line is not present in the vicinity of the merging point and the main lane vehicle m1 is traveling along the lane L1.

In the example of FIG. 3, the main lane (the lane L1) extending in an X-axis direction (a direction of advancement) in the drawings and a merging lane (a lane L3) that merges with the lane L1 from the left in the direction of advancement are shown. The host vehicle M executes automated driving along a route to a destination set by the navigation device 50, and travels along the lane L3 toward a merging point (or a merging area, which will be defined below). It is assumed that there is no stop line near the merging point, and the main lane vehicle m1 is traveling in the lane L1.

Further, the lane L3, and the lane L1 that is the main lane are divided by a fence FF, a branching-off zone CC, a zebra zone (channelizing zone) ZZ, and the like on the front side in the direction of advancement of each vehicle with respect to the merging point. While the fence FF and the branching-off zone CC physically separate the lane L1 and the lane L3, the zebra zone ZZ is only drawn on the road surface and does not physically separate the lane L1 and the lane L3. Further, the fence FF may be provided at a height where the other lane cannot be seen from one lane of the lane L1 and the lane L3.

The merging point is a point at which the lane L1 and the lane L3 are connected, and includes, for example, a region from a soft nose to an end nose of the lane L3. The host vehicle M needs to merge into the lane L1 before traveling the region from the soft nose to the end nose. Further, even when the host vehicle M can physically pass therethrough, it is prohibited for the host vehicle M to merge into the lane L1 by passing through the zebra zone ZZ where traffic is restricted by law.

The first detector 133 detects a traveling state of the host vehicle M including a speed VM of the host vehicle M on the basis of the recognition result of the surrounding recognizer 132. In addition, for example, the second detector 134 selects the main lane vehicle m1 from a timing when a reference place (a car head, a center of gravity, a front wheel axial center, a rear wheel axial center, and the like) of the host vehicle M reaches the branching-off zone CC to a timing when the reference place of the host vehicle M reaches the soft nose that is a terminal end of the zebra zone ZZ. Further, the second detector 134 may select a vehicle adjacent to the host vehicle M and disposed behind the host vehicle M in the direction of advancement among a plurality of vehicles as the main lane vehicle m1 when the plurality of vehicles that are traveling along the lane L1 are recognized. Accordingly, the merging controller 142 can select a vehicle that is easy to use as a merging target as the main lane vehicle m1 when the host vehicle M travels the lane L3 while decelerating and merges with the lane L1 of the main lane.

The second detector 134 detects a speed Vxm1 of the main lane vehicle m1 in the direction of advancement, or a speed Vym1 in a lateral direction (a Y-axis direction in the drawings) with respect to the direction of advancement.

Figure 4:
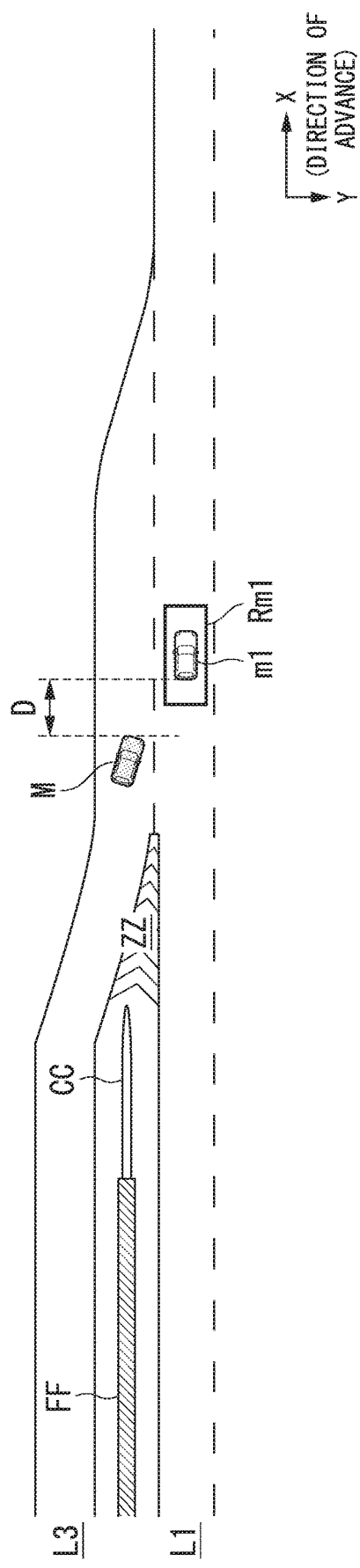
FIG. 4 is a view showing a second scene.

FIG. 4 is a view showing a second scene. The second scene is a situation showing a state in which a predetermined time elapses from the first scene.

The merging controller 142 performs merging control such that the host vehicle M merges into the main lane before a timing at which the host vehicle M arrives at the end nose that is the terminal end of the lane L3. The merging controller 142 performs the merging control such that the host vehicle M merges into the lane L1 on the basis of the detection result of the main lane vehicle m1 detected by the second detector 134. The merging controller 142 controls the merging of the host vehicle M regardless of the lane changing of the main lane vehicle m1 when a distance D with respect to the main lane vehicle m1 that travels along the main lane from the host vehicle M in a forward/rearward direction is a predetermined distance or more. The distance D in the forward/rearward direction may be, for example, a distance from a front end portion of the host vehicle M to a rear end portion of the main lane vehicle m1, or may be a distance from a reference place of the host vehicle M to a reference place of the main lane vehicle m1, as shown in the figures.

When the merging control is started by the merging controller 142, the virtual frame setting part 134-2 sets the virtual frame Rm1 of the main lane vehicle m1. For example, the virtual frame Rm1 is set to hold a marginal distance in front of and behind the main lane vehicle m1 in the direction of advancement, and the size of the virtual frame Rm1 is set so that the vehicle can be safely controlled (or avoided) by a normal braking means even when a preceding vehicle of the main lane vehicle m1 suddenly stops, the following vehicle suddenly accelerates, or lane changing vehicles are accepted in front of and behind the main lane vehicle m1.

In addition, the merging controller 142 controls the merging of the host vehicle M by decelerating the host vehicle M such that the distance D in the forward/rearward direction is the predetermined distance or more, changing the vehicle that is a merging control target to a vehicle that is traveling behind the main lane vehicle m1, or the like, when the distance D of the host vehicle M in the forward/rearward direction with respect to the main lane vehicle m1 that is traveling along the main lane is less than the predetermined distance.

Merging Control when Main Lane is Constituted by Plurality of Lanes

Figure 5:
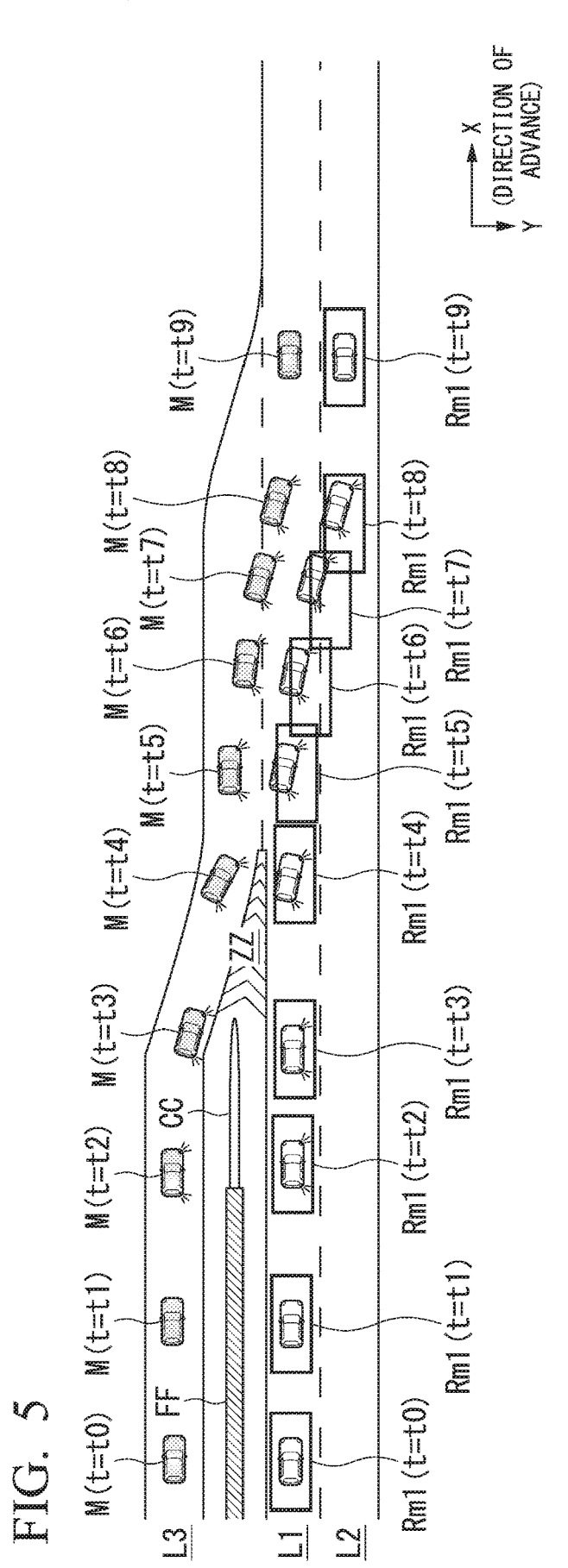
FIG. 5 is a view showing an example of a setting result by a virtual frame setting part of a third scene.

FIG. 5 is a view showing an example of a setting result by the virtual frame setting part 134-2 in a third scene. The third scene is a situation for describing merging control when a main lane is constituted by a plurality of lanes. The host vehicle M is traveling along the lane L3 that merges with the lanes L1 and L2 that constitute the main lane. The main lane vehicle m1 is traveling along the lane L1 of the main lane, and changes the lane to the lane L2 as the host vehicle M is merging with the main lane. It is assumed that there is no stop line in the vicinity of the merging point, and the main lane vehicle m1 is traveling along the lane L1.

FIG. 5 shows positions of the host vehicle M at each of times t0 to t9 until the host vehicle M changes a lane from the lane L3 to the lane L1 and a virtual frame Rm1 set to the main lane vehicle m1 by the virtual frame setting part 134-2. The time t0 to the time t9 indicate an arbitrary length of time, and may indicate a length of time of several [sec] intervals. The virtual frame Rm1 shows, for example, a prediction region of a future position of the main lane vehicle m1, and the inside of the frame shows a region where possibility of interference with the main lane vehicle m1 is high.

Further, in the following description, the time t2 will be described as a timing when the main lane vehicle m1 turns on a turn signal lamp. The time t3 will be described as the timing when the main lane vehicle m1 starts deceleration and the moving amount in the lateral direction is less than the predetermined amount. In addition, the main lane vehicle m1 will be described as starting lane changing from the lane L1 to the lane L2 at the time t4 and completing lane changing at the time t8. The moving amount of the main lane vehicle m1 in the lateral direction therebetween will be described as being more than a predetermined value. The time t9 is a time when traveling is started in a state in which the main lane vehicle m1 maintains the lane L2.

The second detector 134 detects a traveling state of the main lane vehicle m1 that travels along the main lane that is a merging destination when the host vehicle M is traveling on a merging road on the basis of the recognition result of the surrounding recognizer 132. For example, the second detector 134 detects whether the main lane vehicle m1 turns on the turn signal lamp, a speed Vxm1 of the main lane vehicle m1 in the direction of advancement, and a speed Vym1 in the direction of advancement in the lateral direction.

The virtual frame setting part 134-2 sets the virtual frame Rm1 on the basis of the detection result of the second detector 134, in particular, the speed Vym1 in the lateral direction. The virtual frame setting part 134-2 offsets the virtual frame Rm1 from the main lane vehicle m1 in a direction separating from the merging road when it is detected that the main lane vehicle m1 is in a traveling state in which lane changing is performed.

The virtual frame setting part 134-2 offsets the virtual frame Rm1 in a Y-axis direction (a direction from the lane L1 toward the lane L2) in the drawings from the time t2 as shown when it is detected that the main lane vehicle m1 is in a traveling state in which the lane changing is performed. Further, the offset amount may be set on the basis of the speed Vym1 in the lateral direction. For example, the virtual frame setting part 134-2 offsets the virtual frame Rm1 more greatly according to a magnitude of the speed Vym1 in the lateral direction when the speed Vym1 in the lateral direction is a predetermined level or more.

For example, the virtual frame setting part 134-2 sets a predetermined amount (for example, about several tens of [cm]) because the offset amount of the time t3 when deceleration is started toward lane changing has a small speed Vym1 in the lateral direction in actuality. For the offset amount at the time t4 to the time t8, the virtual frame setting part 134-2 sets the offset amount according to the magnitude of the speed Vym1 in the lateral direction.

Since the virtual frame Rm1 expresses an estimation region of a future position of the main lane vehicle m1, the virtual frame setting part 134-2 offsets the virtual frame Rm1 even at the time t3 when the moving amount in the lateral direction is small.

Further, the virtual frame setting part 134-2 may offset the virtual frame Rm1 on the basis of the detection result of the speed Vxm1 in the longitudinal direction by the second detector 134 when the second detector 134 detects that the main lane vehicle m1 is in a traveling state in which the lane changing is performed. In this case, for example, the virtual frame setting part 134-2 offsets the virtual frame Rm1 toward a side behind the main lane vehicle m1 in the direction of advancement when the main lane vehicle m1 is decelerating. In addition, for example, the virtual frame setting part 134-2 offsets the virtual frame Rm1 toward a side in front of the main lane vehicle m1 in the direction of advancement when the main lane vehicle m1 is accelerating.

The merging controller 142 performs processing such as derivation of a curvature of a traveling trajectory of the main lane vehicle m1 or the like, on the basis of prediction of a time-space action by the virtual frame set by the virtual frame setting part 134-2 (a moving situation of a position of the virtual frame Rm1 set at the time t0 to the time t8), and performs the merging control of merging the host vehicle M into the main lane.

The merging controller 142 controls the host vehicle M to merge into the main lane until a timing when the host vehicle M arrives at the end nose that is a terminal end of the lane L3. The merging controller 142 controls the host vehicle M to start to merge into the lane L1 on the basis of the detection result of the main lane vehicle m1 detected by the second detector 134. The merging controller 142 controls merging of the host vehicle M regardless of lane changing of the main lane vehicle m1 when the distance D in the forward/rearward direction of the host vehicle M with respect to the main lane vehicle m1 that is traveling along the main lane is a predetermined distance or more.

The merging controller 142 controls merging start of the host vehicle M when the distance D in the forward/rearward direction of the host vehicle M with respect to the main lane vehicle m1 that is traveling along the main lane is less than the predetermined distance and the main lane vehicle m1 changes a lane from the lane L1 to the lane L2. The merging controller 142 controls merging of the host vehicle M by decelerating the host vehicle M such that the distance D in the forward/rearward direction becomes the predetermined distance or more, or by changing the vehicle that is a merging control target to a vehicle that is traveling behind the main lane vehicle m1, when the distance D in the forward/rearward direction of the host vehicle M with respect to the main lane vehicle m1 that is traveling along the main lane is less than the predetermined distance and the main lane vehicle m1 does not change a lane from the lane L1 to the lane L2.

Virtual Frame

Hereinafter, a setting example of the virtual frame Rm1 by the virtual frame setting part 134-2 will be described. The virtual frame setting part 134-2 sets the virtual frame Rm1 including at least a reference place of the main lane vehicle m1. The virtual frame setting part 134-2 sets the virtual frame Rm1 to include an outline of the main lane vehicle m1 when the main lane vehicle m1 maintains the traveling lane. The virtual frame setting part 134-2 sets the virtual frame Rm1 to include the reference place of the main lane vehicle m1 and the virtual frame RM1 is offset toward a lane which is the lane change destination when the main lane vehicle m1 changes the lane.

Figure 6:
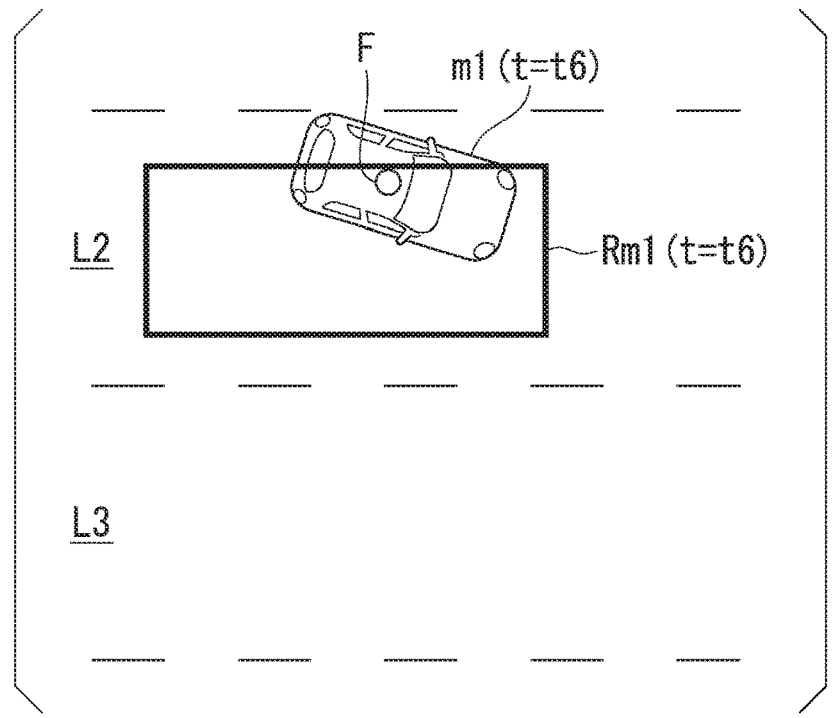
FIG. 6 is an enlarged view of a virtual frame Rm1 at a time t6.

FIG. 6 is an enlarged view of the virtual frame Rm1 at the time t6 shown in FIG. 5. The virtual frame setting part 134-2 sets the virtual frame Rm1 to include a reference place F of the main lane vehicle m1 even when the virtual frame Rm1 is offset toward the lane L3 which is the lane change destination.

Figure 7:
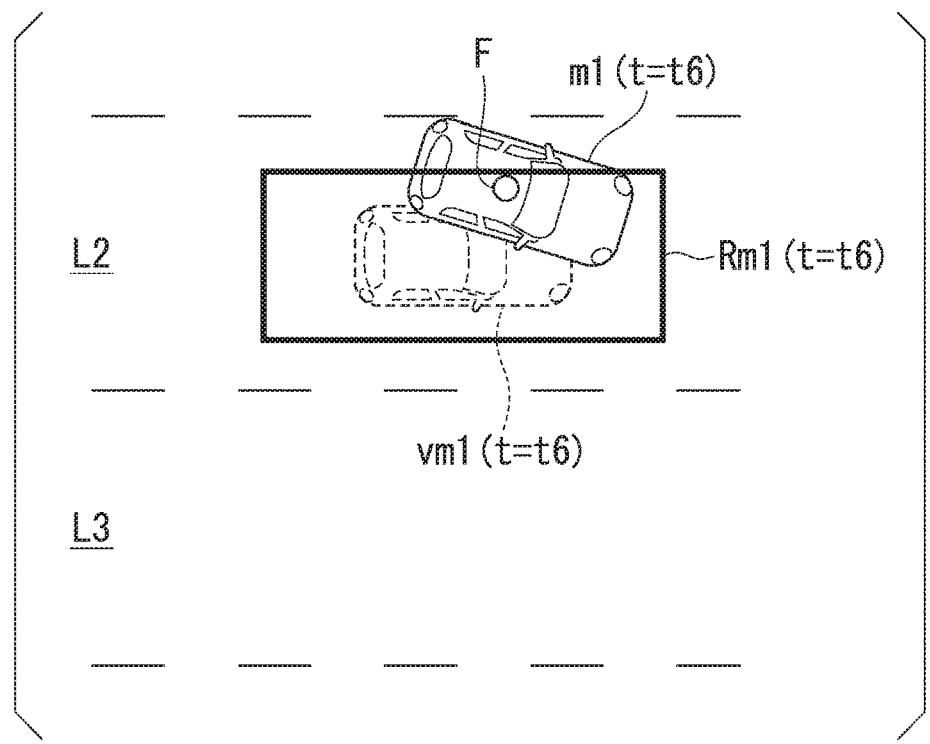
FIG. 7 is a view for describing offsetting of the virtual frame Rm1.

FIG. 7 is a view for describing offsetting of the virtual frame Rm1 shown in FIG. 6. For example, the virtual frame setting part 134-2 sets the virtual frame Rm1 with respect to a predicted attitude (a vehicle vm1 shown by a broken line in the drawings) of the main lane vehicle m1 when movement in the lateral direction is completed at the time t6.

Figure 8:
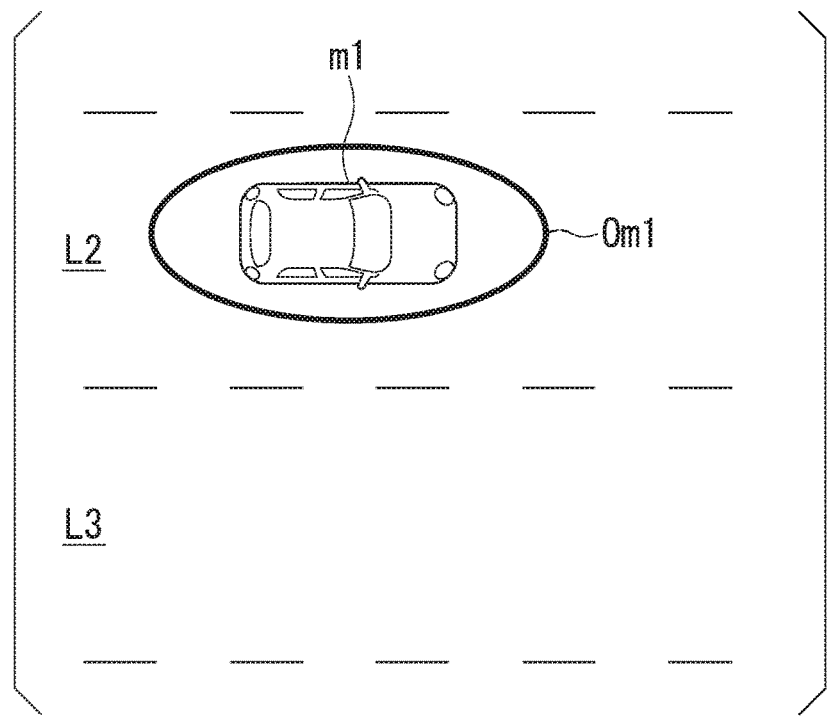
FIG. 8 is a view for describing a virtual frame Om1.

FIG. 8 is a view for describing a virtual frame Om1 having a substantially circular shape that is a variant of the virtual frame. The virtual frame Om1 is set to include the outline of the main lane vehicle m1 when the main lane vehicle m1 is seen in a plan view or a side view, like the above-mentioned rectangular virtual frame Rm1.

Figure 9:
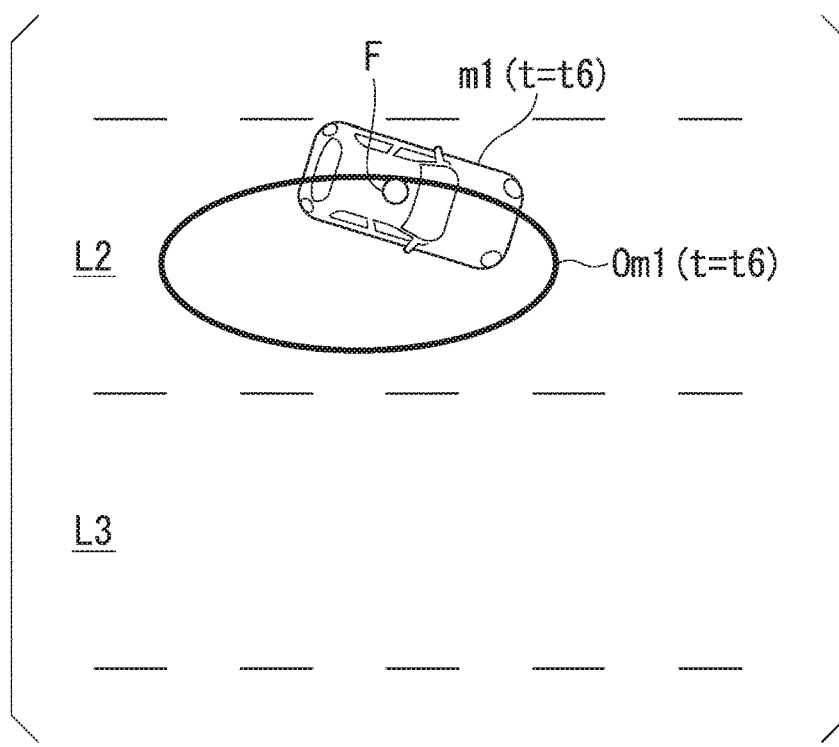
FIG. 9 is a view for describing offsetting of the virtual frame Om1.

FIG. 9 is a view for describing offsetting of the virtual frame Om1 shown in FIG. 8. The main lane vehicle m1 shown in FIG. 9 is the same as the main lane vehicle m1 at a time point of the time t6 shown in FIG. 6 and FIG. 7. The virtual frame setting part 134-2 sets the virtual frame Om1 to include the reference place F of the main lane vehicle m1 even when the virtual frame Om1 is offset toward the lane L3 which is the lane change destination. While the virtual frame will be described below as being a rectangular shape, it is not limited to the rectangular shape and may be, for example, a substantially circular shape as shown in FIG. 8 and FIG. 9 or may be a polygonal shape other than a rectangular shape.

Improvement in Startability of Merging Control

The merging controller 142 makes merging control of the host vehicle M easier to start when it is detected by the second detector 134 that the traffic volume of main lane is a predetermined amount or more (the main lane is in a traffic congested state) in comparison with a case in which it is detected that the traffic volume of the main lane is less than the predetermined amount (the main lane is not in the traffic congested state). "Making the merging control of the host vehicle M easier" includes, for example, reducing a marginal distance with respect to the other vehicle in the forward/rearward direction, or the like. Even in a case the traffic volume of the main lane is the predetermined amount or more and an intervehicular distance between the vehicles that are traveling along the main lane is not a sufficient distance for performing the merging control, the main lane vehicle m1 recognizes the presence of the host vehicle M on the merging road, secures the intervehicular distance from the preceding vehicle of the main lane vehicle m1 by slowing down such that the host vehicle M can merge into the main lane and, and thus the possibility that the host vehicle M becomes possible to merge into the main lane is high. For this reason, the merging controller 142 may improve startability of the merging control according to the traffic volume of the main lane.

Further, reducing a marginal distance with respect to the other vehicle in the forward/rearward direction may include, for example, reducing a size of the frame of the virtual frame Rm1 on the side of the vehicle length to be smaller than that of the virtual frame Rm1 at normal situations by using the virtual frame setting part 134-2. In addition, reducing the marginal distance in the forward/rearward direction with respect to the other vehicle may include reducing the entire size of the frame of the virtual frame Rm1 compared to that at normal situations by using the virtual frame setting part 134-2 (for example, reducing the size to about 90 [%] of the size of the virtual frame Rm1) at normal situations.

In addition, the merging controller 142 may facilitate starting of the merging control of the host vehicle M when the main lane is constituted by a plurality of lanes and the first lane of the main lane adjacent to the merging road is traffic congested in comparison with a case in which the main lane is a single lane or the first lane is not traffic congested. Even when the traffic volume of the first lane is the predetermined amount or more and the intervehicular distance of the main lane vehicle is not a sufficient distance for performing the merging control or the like, the main lane vehicle m1 recognizes the presence of the host vehicle M on the merging road, the host vehicle M slowly moves to merge into the main lane to secure an intervehicular distance from the preceding vehicle of the main lane vehicle m1, or the lane is changed to a lane other than the first lane (hereinafter referred to as a second lane), and thus, the host vehicle M is likely to merge into the main lane. For this reason, the merging controller 142 may change startability of the merging control on the basis of whether the main lane is a single lane.

In addition, the merging controller 142 may facilitate starting of the merging control of the host vehicle M when the main lane is constituted by a plurality of lanes, the first lane of the main lane adjacent to the merging road is in traffic congested state and traffic volume of the second lane far from the merging road and adjacent to the first lane is less than the predetermined amount in comparison with the case in which the traffic volume of the second lane is the predetermined amount or more. This is because, even when the first lane is traffic congested, the main lane vehicle m1 recognizes the presence of the host vehicle M on the merging road, secures the intervehicular distance from the preceding vehicle of the main lane vehicle m1 by slowing down or by changing the traveling lane to the second lane such that the host vehicle M can merge into the main lane, and thus the possibility that the host vehicle M becomes possible to merge into the main lane is high.

Improvement in Startability According to Number of Lane Changing Vehicles

In addition, the merging controller 142 may change the startability of the lane changing of the host vehicle M according to the traveling aspect of the main lane vehicle, and for example, changes the startability of the lane changing on the basis of the number of main lane vehicles that perform lane changing in the first lane and the number of main lane vehicle that travel straight without performing lane changing in the first lane.

Figure 10:
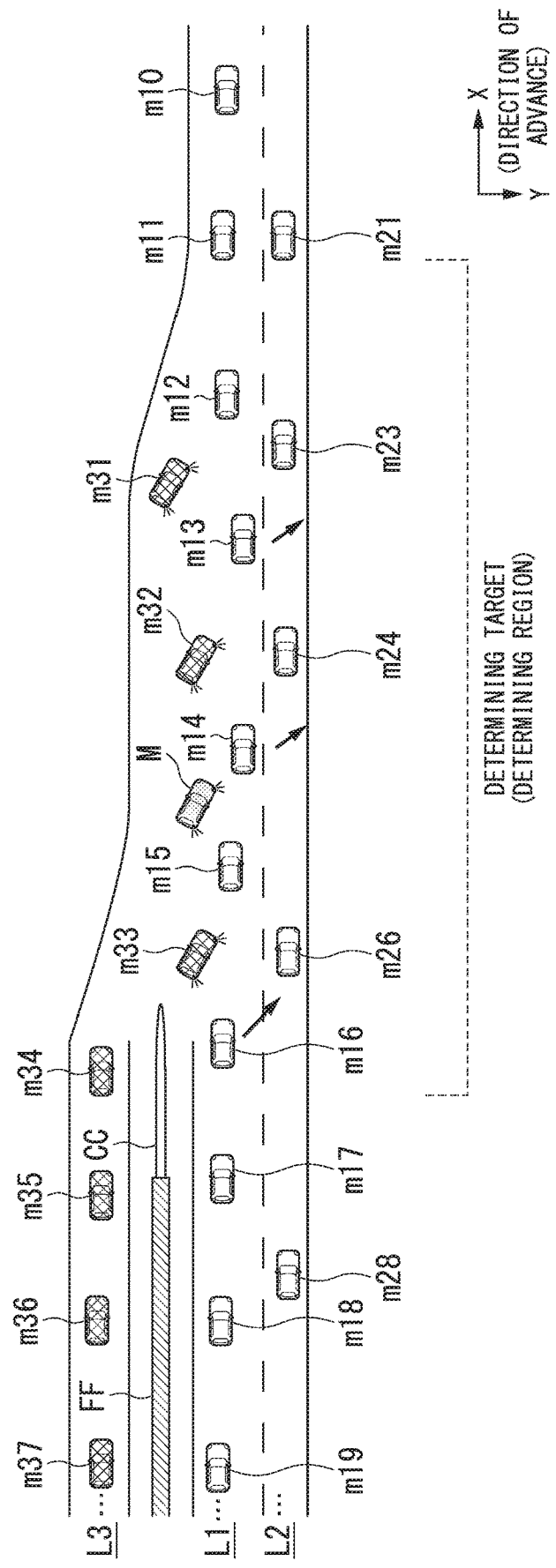
FIG. 10 is a view showing a fourth scene.

FIG. 10 is a view showing a fourth scene. The fourth scene is a situation in which a plurality of vehicles that change a lane from the lane L1 to the lane L2 of the main lane are present. Further, in the following description, vehicles that are traveling along the lane L1 are referred to as main lane vehicles m1 (the main lane vehicles m10, m11 . . . ), vehicles that are traveling along the lane L2 are referred to as main lane vehicles m2 (the main lane vehicles m20, m21 . . . ), and vehicles other than the host vehicle M that are traveling along the lane L3 of the merging road are referred to as merging vehicles m3 (the merging vehicles m31, m32 . . . ).

In the fourth scene, while the main lane vehicle m13, the main lane vehicle m14 and the main lane vehicle m16 among the vehicles that are traveling along the lane L1 are trying to change the lane from the lane L1 to the lane L2, the other main lane vehicles are traveling straight along the traveling lane. In addition, in the fourth scene, the merging vehicles m31 to m33 and the host vehicle M are trying to change the lane to the lane L1. For example, the merging vehicle m31 is trying to change the lane in between the main lane vehicle m12 and the main lane vehicle m13 that are traveling along the lane L1. In addition, the main lane vehicle m13 is trying to change the lane from the lane L1 to the lane L2 according to the lane changing of the merging vehicle m31.

The merging controller 142 facilitates starting of the merging control of the host vehicle M when it is detected by the second detector 134 that a plurality of other vehicles that are traveling along the main lane are present and the number of the other vehicles that performs lane change from the first lane which is adjacent to the merging road is equal to or greater than the number of the other vehicles that do not perform lane change from the first lane. For example, the merging controller 142 determines whether the startability of the merging control is changed on the basis of the number of the vehicles that performs lane change to the lane L2 and the number of the vehicles that travels straight along the lane L1 within a range adjacent to at least a region from a soft nose to an end nose of the lane L3 (within a range in which the main lane vehicles m12 to m16 in the drawings are traveling). The merging controller 142 facilitates starting of the merging control of the host vehicle M because the number of the vehicles that change the lane to the lane L2 is three: the main lane vehicle m13, the main lane vehicle m14 and the main lane vehicle m16, the number of the vehicles that travel straight along the lane L1 is two: the main lane vehicle m12 and the main lane vehicle m15, and the number of the vehicles that changes the lane is greater than that of the vehicles that travel straight.

Further, targets for counting the number of the vehicles that performs lane change by the second detector 134 may be a maximum range that can be detected by the second detector 134 or all of the main lane vehicles m10 to m19 may be the counting targets.

In addition, the merging controller 142 may facilitate starting of the merging control of the host vehicle M when it is detected by the second detector 134 that the main lane is in traffic congested state (when the main lane is constituted by a plurality of lanes, it is detected that both of the first lane and the second lane are in traffic congested state) and it is detected by the first detector 133 that the merging road along which the host vehicle M is traveling is in traffic congested state.

Size Change of Virtual Frame

When the change of improving the startability of the merging control is performed by the merging controller 142, for example, the virtual frame setting part 134-2 may change the size of the virtual frame set on the main lane vehicle, in particular, the size in the vehicle length direction.

Figure 11:
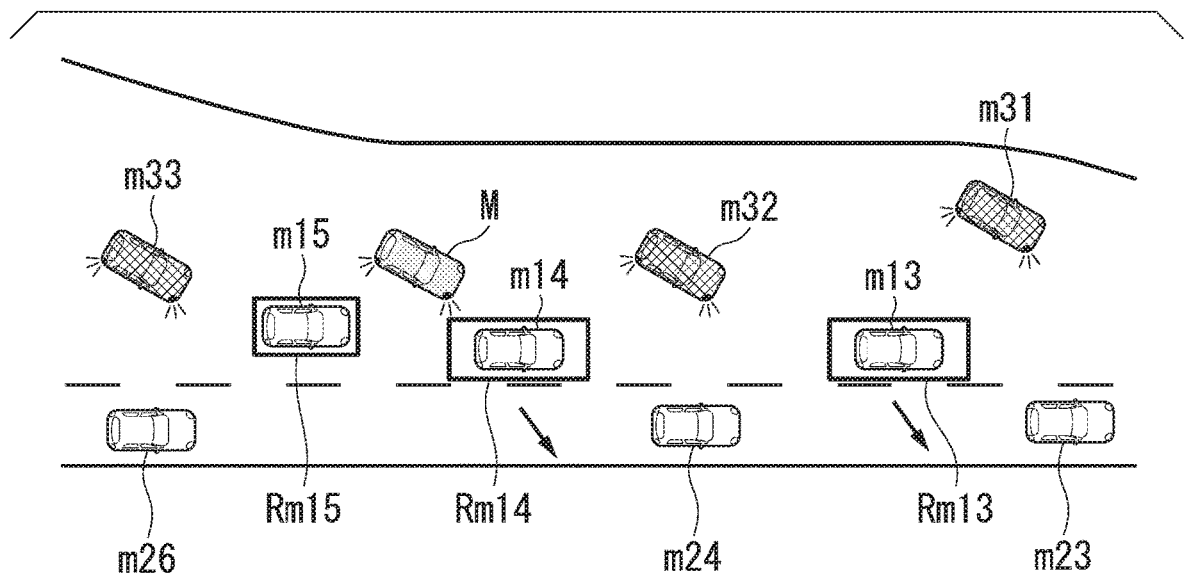
FIG. 11 is a view for describing a size change of a virtual frame in the fourth scene.

FIG. 11 is a view for describing size changing of a virtual frame in the fourth scene. As shown in FIG. 11, the virtual frame setting part 134-2 in the fourth scene sets the virtual frames Rm13 to Rm15 of the main lane vehicles m13 to m15, respectively. The virtual frame setting part 134-2 sets, for example, the virtual frames Rm13 and Rm14 having a standard size on the main lane vehicles m13 and m14 that are changing the lane from the lane L1 to the lane L2. Meanwhile, the virtual frame setting part 134-2 sets, for example, the size of the virtual frame Rm15 of the main lane vehicle m15 that does not change the lane by changing the size to be smaller than that of the virtual frame Rm13.

Figure 12:
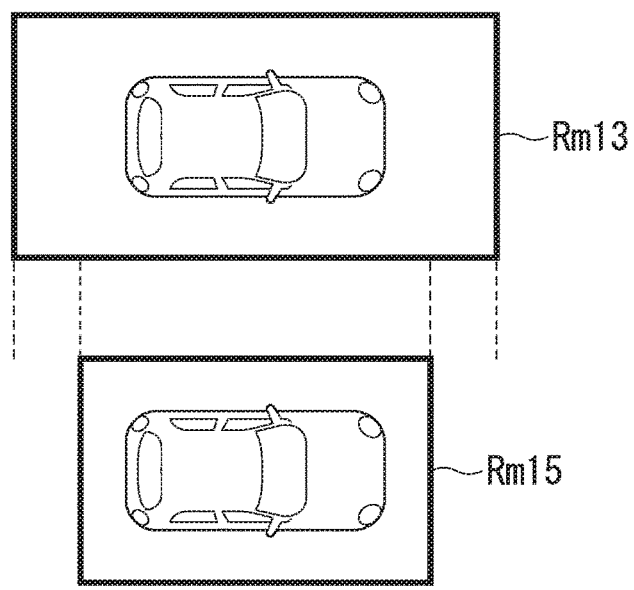
FIG. 12 is a view for describing a size of the virtual frame upon the size change.

FIG. 12 is a view for describing a size of the virtual frame upon size changing. An upper part of FIG. 12 is a view showing the virtual frame Rm13 set by the virtual frame setting part 134-2 with respect to the main lane vehicle m13 in FIG. 11. A lower part of FIG. 12 is a view showing the virtual frame Rm15 set by the virtual frame setting part 134-2 with respect to the main lane vehicle m15 in FIG. 11. The virtual frame setting part 134-2 sets a length of the virtual frame Rm15 in the direction of advancement to be shorter than that of the main lane vehicle (for example, the main lane vehicle m13) that is changing the lane between the lanes when the main lane vehicle m15 that does not change the lane is detected. Accordingly, the merging controller 142A can facilitate merging of the host vehicle M in front of or behind the main lane vehicle m15. In this way, it is possible to urge the main lane vehicle to change lane by making the host vehicle M to approach the main lane, to perform warning to the main lane vehicle at behind not to perform acceleration and to make notification with respect to the other vehicle so that the host vehicle can more easily merge into the main lane. Further, in addition to reduction in length of the virtual frame Rm15 in the direction of advancement, reduction of the marginal distance only in front of the main lane vehicle m15 in the direction of advancement, reduction of the marginal distance only behind in the direction of advancement, reduction in length of the virtual frame Rm15 in a vehicle width direction, and the like may be performed.

Further, when the merging controller 142 can adjust the degree of the startability of the merging control stepwise, for example, the degree of the startability may be set as following on the basis of the detection results by the first detector 133 and the second detector 134.

(Degree: low) When the main lane is a single lane and is in traffic congested state or when the main lane is constituted by a plurality of lanes and all lanes are in traffic congested state: a size of the virtual frame by the virtual frame setting part 134-2 is reduced.

(Degree: high) When the main lane is constituted by a plurality of lanes and the second lane is not in traffic congested state while the first lane is in traffic congested state, or when the number of the vehicles that change the lane from the first lane to the second lane is greater than the number of the vehicles that do not change the lane, or when the merging lane and the main lane are in traffic congested state: a size of the virtual frame by the virtual frame setting part 134-2 is further reduced.

Further, here, while the example in which the degree of the startability that can be controlled by the merging controller 142 is defined as three steps (no change, "degree: low" and "degree: high") has been exemplarily described, it is not limited thereto and the degree of the startability may be controlled in a plurality of degrees of four steps or more. For example, the merging controller 142 may increase the degree of the startability as the number of conditions that are established is increased in flowcharts of FIG. 14 to FIG. 16, which will be described below.

Processing Flow

Figure 13:
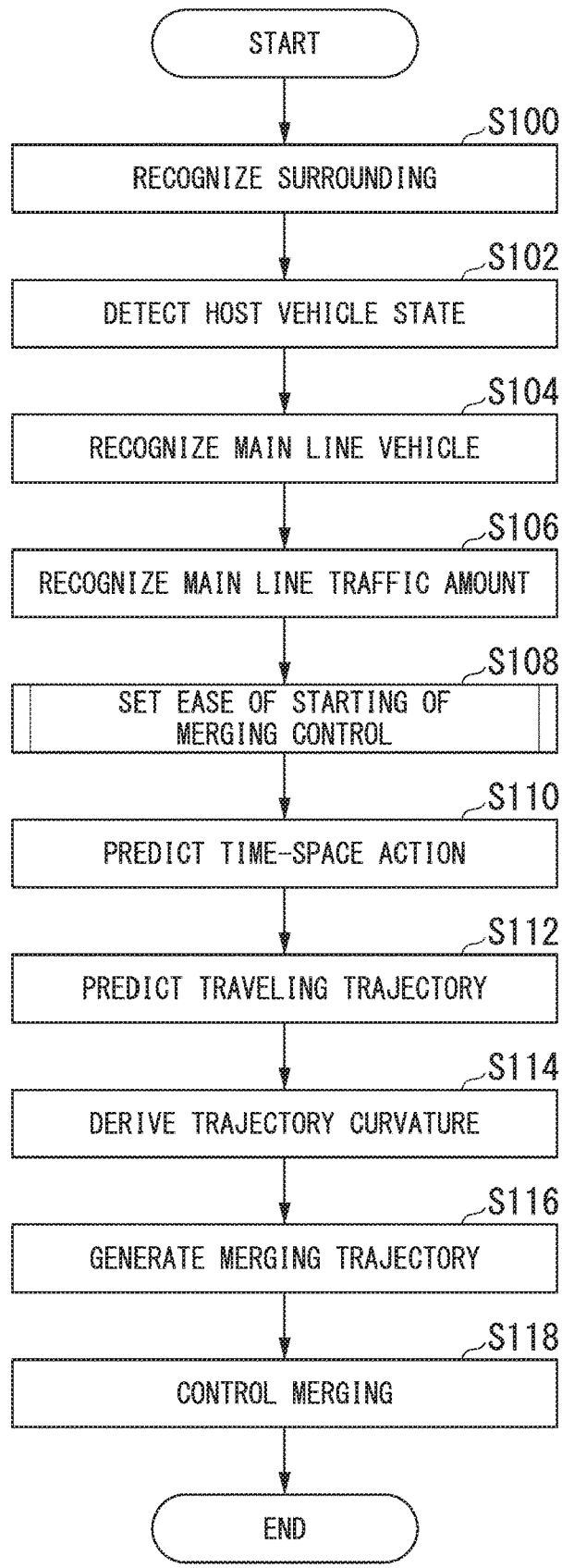
FIG. 13 is a flowchart showing another example of merging trajectory generating processing by the vehicle controller.

FIG. 13 is a flowchart showing another example of merging trajectory generating processing by the vehicle controller 100.

First, the surrounding recognizer 132 recognizes a surrounding situation of the host vehicle M (step S100). Next, the first detector 133 detects a state of the host vehicle M (step S102). Next, the second detector 134 detects the main lane vehicle m1 (step S104), and recognizes a traffic volume of the main lane on the basis of the number of the vehicles that travel along the main lane (step S106). Next, the merging controller 142 performs setting of ease of starting of the merging control (step S108). A flow of processing in step S108 will be described below in detail.

Next, the second detector 134 predicts a time-space action of the main lane vehicle m1 (step S110), and predicts a target trajectory of the main lane vehicle m1 (or detects an actual traveling trajectory) (step S112). Next, the curvature deriving part 134-3 derives a curvature of the traveling trajectory of the main lane vehicle m1 (step S114). Next, the merging controller 142 generates a merging trajectory of the host vehicle M on the basis of the results in steps S102 to S114 (step S116), and starts the merging control (step S118). Hereinabove, processing of the flowchart is terminated.

Figure 14:
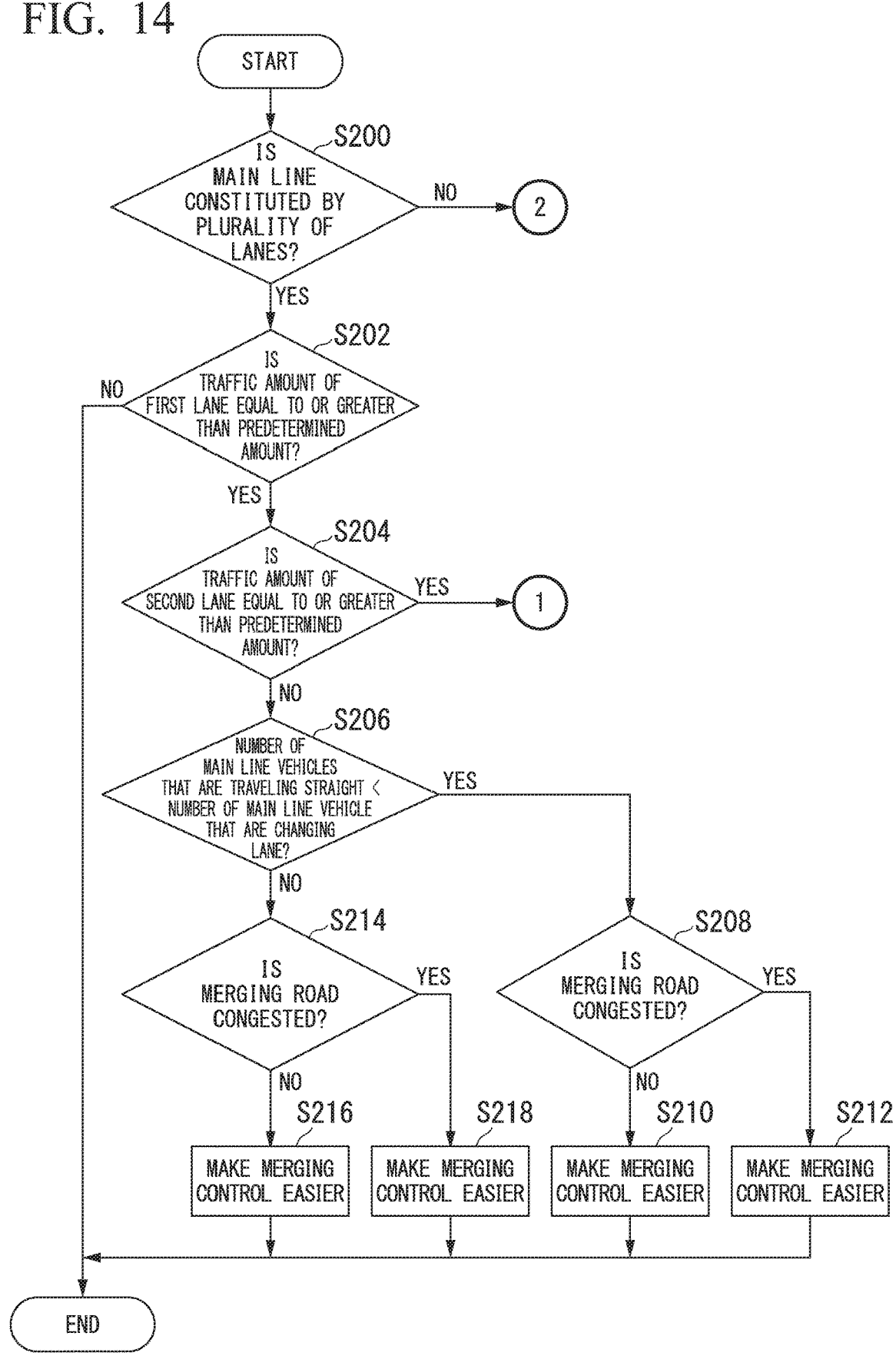
FIG. 14 is a flowchart showing an example of a flow of processing of setting starting easiness in merging control.
Figure 15:
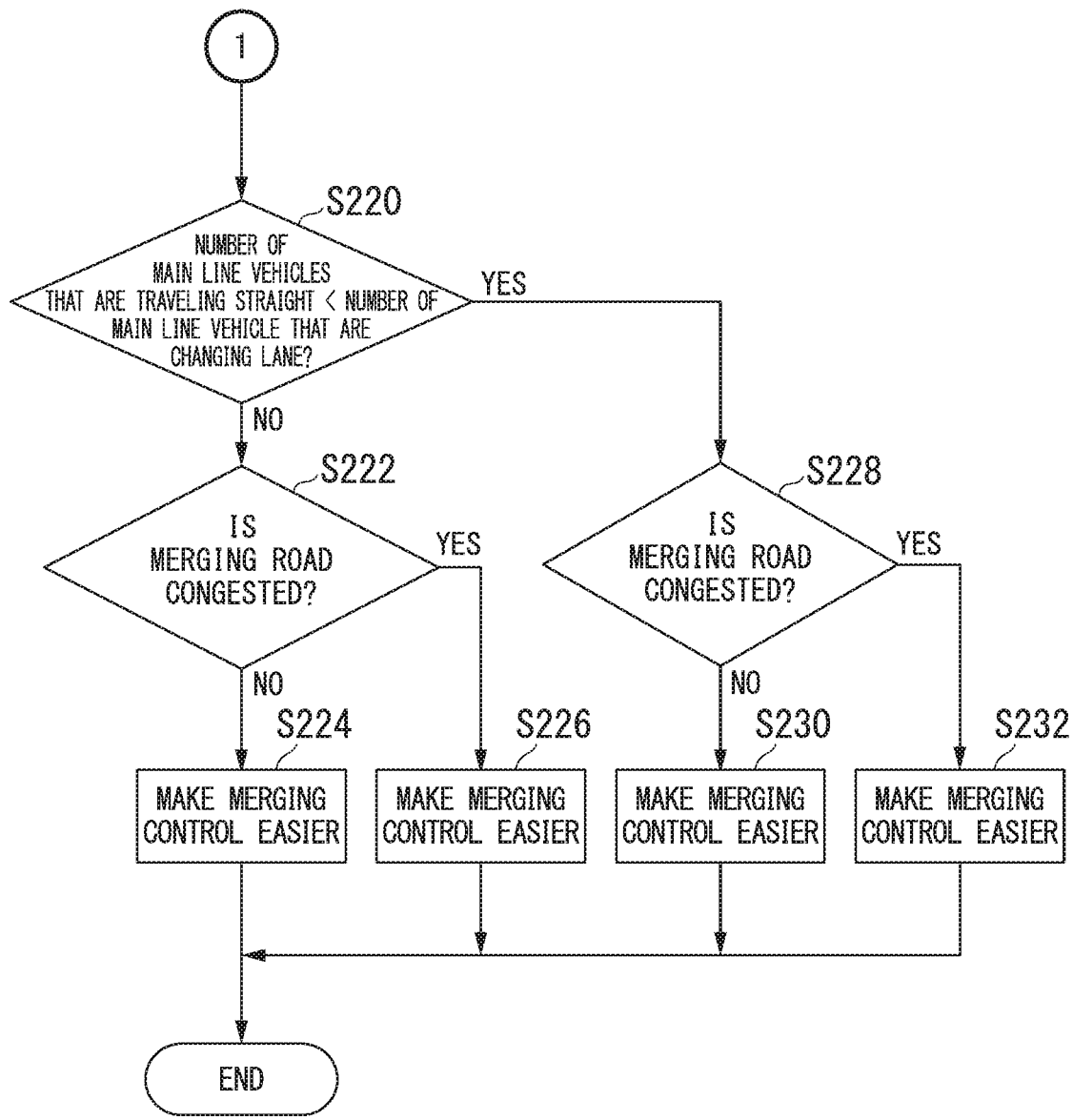
FIG. 15 is a flowchart showing an example of a flow of processing of setting starting easiness in merging control.
Figure 16:
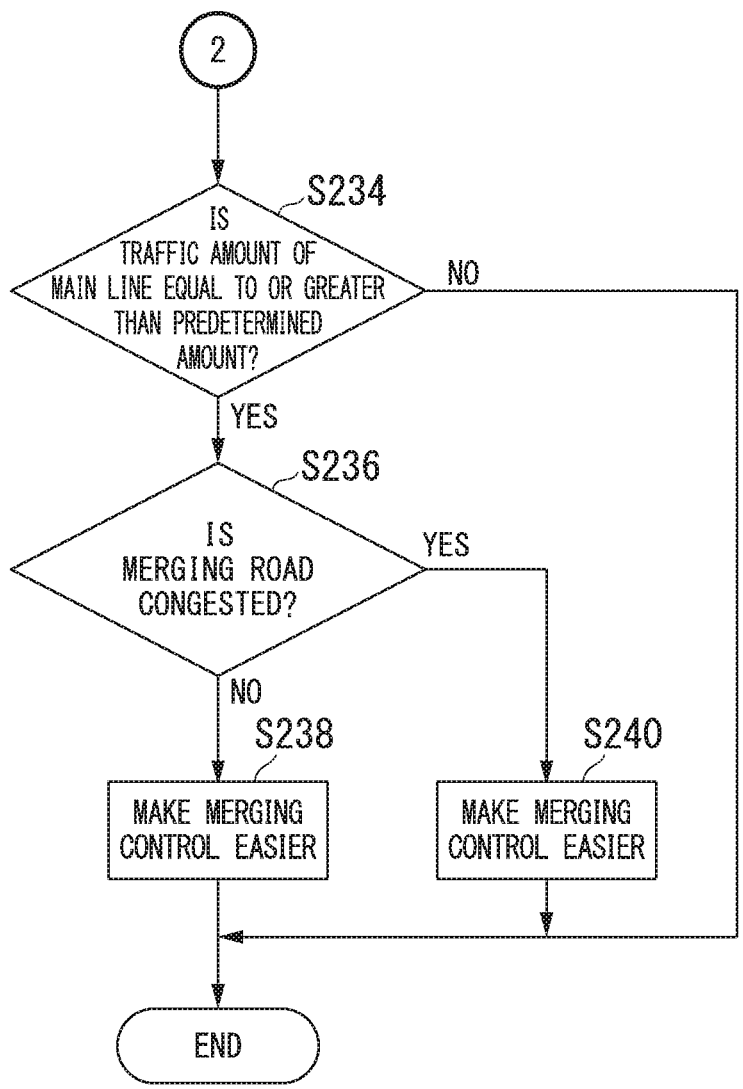
FIG. 16 is a flowchart showing an example of a flow of processing of setting starting easiness in merging control.

FIG. 14 to FIG. 16 are flowcharts showing an example of a flow of processing of setting of ease of starting of the merging control. The flowcharts shown in FIG. 14 to FIG. 16 correspond to details of the processing in step S108 of the flowchart in FIG. 13.

First, the surrounding recognizer 132 determines whether the main lane is constituted by a plurality of lanes (step S200). When it is determined that the main lane is constituted by the plurality of lanes, the second detector 134 determines whether the traffic volume of the first lane is the predetermined amount or more (whether the first lane is in traffic congested state) (step S202). When it is determined that the traffic volume of the first lane is less than the predetermined amount, the second detector 134 terminates the processing of the flowchart (i.e., setting of the ease of starting of the merging control is not changed). When it is determined that the traffic volume of the first lane is the predetermined amount or more, the second detector 134 determines whether the traffic volume of the second lane is the predetermined amount or more (whether the second lane is in traffic congested state) (step S204). When it is determined that the traffic volume of the second lane is less than the predetermined amount, the second detector 134 determines whether the number of the vehicles that are changing the lane to the second lane, among the main lane vehicles that are traveling along the first lane, is equal to or greater than the number of the other vehicles that do not change the lane from the first lane (step S206). When it is determined that the number of the vehicles that are changing the lane to the second lane is greater than that of the other vehicles, the first detector 133 determines whether the merging road is in traffic congested state (step S208). When the merging road is not in traffic congested state, the merging controller 142 makes the merging control easier (step S210), and terminates the processing of the flowchart. When the merging road is in traffic congested state, the merging controller 142 makes the merging control easier (step S212), and terminates the processing of the flowchart.

Step S210 and step S212 correspond to, for example, that the degree of the startability of the merging control by the merging controller 142 is set to "degree: high." Further, when the degree of the startability by the merging controller 142 can be controlled at a plurality of degrees of four steps or more, the degree may be set to a higher degree in step S212 than in step S210.

In step S206, when it is determined that the number of the vehicles that are changing the lane to the second lane is equal to or smaller than the number of the main lane vehicles that are traveling straight, the first detector 133 determines whether the merging road is in traffic congested state (step S214). When the merging road is not in traffic congested state, the merging controller 142 makes the merging control easier (for example, the degree of the startability of the merging control is set to "degree: high") (step S216), and terminates the processing of the flowchart. When the merging road is in traffic congested state, the merging controller 142 makes the merging control easier (for example, the degree of the startability of the merging control is set to "degree: high") (step S218), and terminates the processing of the flowchart.

Next, FIG. 15 will be described. In step S204 of FIG. 14, when it is determined that the traffic volume of the second lane is the predetermined amount or more, the second detector 134 determines whether the number of the vehicles that are changing the lane to the second lane, among the main lane vehicles that are traveling along the first lane, is equal to or greater than the number of the other vehicles that do not change the lane from the first lane (step S220). When it is determined that the number of the vehicles that are changing the lane to the second lane is equal to or smaller than the number of the main lane vehicles that are traveling straight, the first detector 133 determines whether the merging road is in traffic congested state (step S222). When the merging road is not in traffic congested state, the merging controller 142 makes the merging control easier (for example, the degree of the startability of the merging control is set to "degree: high") (step S224), and terminates the processing of the flowchart. When the merging road is in traffic congested state, the merging controller 142 makes the merging control easier (for example, the degree of the startability of the merging control is set to "degree: high") (step S226), and terminates the processing of the flowchart.

In step S220, when it is determined that the number of the vehicles that are changing the lane to the second lane is greater, the first detector 133 determines whether the merging road is in traffic congested state (step S228). When the merging road is not in traffic congested state, the merging controller 142 makes the merging control easy (step S230), and terminates the processing of the flowchart. When the merging road is in traffic congested state, the merging controller 142 makes the merging control easier (step S232), and terminates the processing of the flowchart.

Further, step S230 corresponds to setting the degree of the startability of the merging control lower than that in step S232 (for example, when being set to "degree: high" in step S232, the degree is set to "degree: low" in step S230).

Next, FIG. 16 will be described. When it is determined that the main lane is not constituted by the plurality of lanes in step S200, the second detector 134 determines whether the traffic volume of the main lane is equal to or greater than the predetermined amount (whether the main lane is in traffic congested state) (step S234). When it is determined that the traffic volume of the main lane is less than the predetermined amount, the second detector 134 terminates the processing of the flowchart (i.e., setting of ease of starting of the merging control is not changed). When it is determined that the traffic volume of the main lane is equal to or greater than the predetermined amount, the first detector 133 determines whether the merging road is in traffic congested state (step S236). When the merging road is not in traffic congested state, the merging controller 142 makes the merging control easy (for example, the degree of the startability of the merging control is set to "degree: low") (step S238), and terminates the processing of the flowchart. When the merging road is in traffic congested state, the merging controller 142 makes the merging control easier (for example, the degree of the startability of the merging control is set to "degree: high") (step S240), and terminates the processing of the flowchart. Hereinabove, description of the processing of the flowchart is terminated.

The vehicle controller 100 of the above-mentioned embodiment can perform the stable lane changing even upon the traffic congestion by changing easiness of the merging control using the merging controller 142 on the basis of the detection result of the vehicle such as the traffic volume or the like of the main lane vehicle by the second detector 134.

Hardware Configuration

Figure 17:
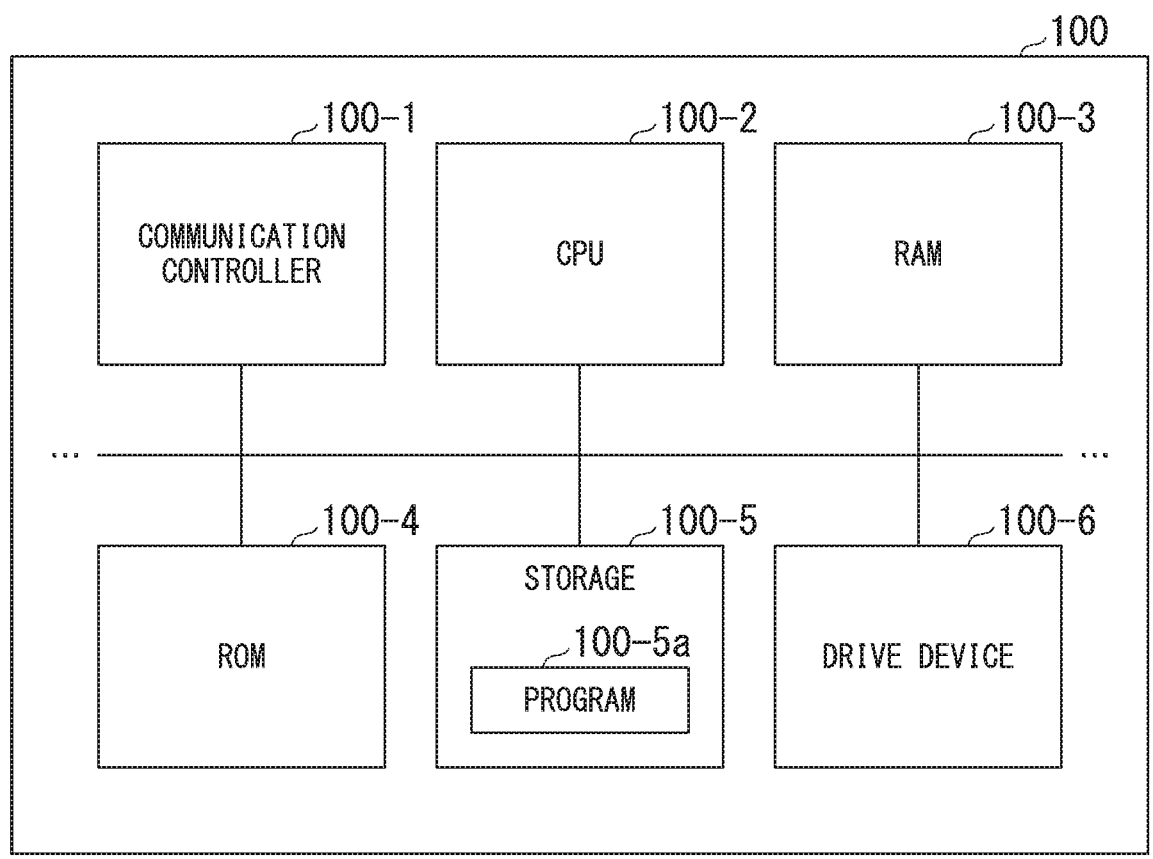
FIG. 17 is a view showing an example of a hardware configuration of the vehicle controller of the embodiment.

FIG. 17 is a view showing an example of a hardware configuration of the vehicle controller 100 of the embodiment. As shown, each of various controllers has a configuration in which a communication controller 100-1, a CPU 100-2, a RAM 100-3 used as a working memory, a ROM 100-4 on which a boot program or the like is stored, a storage 100-5 such as a flash memory, an HDD, or the like, a drive device 100-6, and the like, are connected to each other by an internal bus or a dedicated communication line. The communication controller 100-1 performs communication with the components other than the vehicle controller 100. A program 100-5a executed by the CPU 100-2 is stored in the storage 100-5. The program is installed on the RAM 100-3 by a direct memory access (DMA) controller (not shown) or the like and executed by the CPU 100-2. Accordingly, a part or all of the first controller 120 and the second controller 160 of the vehicle controller 100 is realized.

The above-mentioned embodiment can be expressed as follows.

A vehicle controller includes:
a storage on which a program is stored; and
a hardware processor,
wherein the hardware processor executes the program stored in the storage, and thus,
the vehicle controller detects a traveling state of a host vehicle,
detects a traveling state of an other vehicle that is traveling along a main lane when the host vehicle travels along a merging road, and detects a traffic volume of the main lane,
controls merging of the host vehicle regardless of the lane changing of the other vehicle when a distance in a forward/rearward direction of the host vehicle with respect to the other vehicle is equal to or greater than a predetermined value, and
facilitates starting of merging control of the host vehicle when it is detected that the traffic volume of the main lane is equal to or greater than the predetermined amount.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle controller comprising:
a first detector configured to detect a traveling state of a host vehicle;
a second detector configured to detect:
a traveling state of another vehicle that travels along a main lane when the host vehicle travels along a merging road, and
a traffic volume of the main lane; and
a merging controller configured to control merging of the host vehicle regardless of a lane changing of the other vehicle when a distance in a forward/rearward direction of the host vehicle with respect to the other vehicle is equal to or greater than a predetermined amount, wherein the merging controller facilitates starting of merging control of the host vehicle when:
it is detected, by the second detector, that a traffic volume of the main lane is equal to or greater than a predetermined amount,
the main lane comprises a plurality of lanes, and
a traffic volume of a first lane of the main lane adjacent to the merging road and a second lane of the main lane adjacent to the first lane is equal to or greater than a predetermined amount in comparison with a first case in which the traffic volume of the first lane is less than a predetermined amount.

2. The vehicle controller according to claim 1, wherein the merging controller facilitates starting of merging control of the host vehicle in a second case in which the main lane is a single lane.

3. A vehicle controller, comprising:
a first detector configured to detect a traveling state of a host vehicle;
a second detector configured to detect:

a traveling state of another vehicle that travels along a main lane when the host vehicle travels along a merging road, and a traffic volume of the main lane; and a merging controller configured to control merging of the host vehicle regardless of a lane changing of the other vehicle when a distance in a forward/rearward direction of the host vehicle with respect to the other vehicle is equal to or greater than a predetermined amount, wherein the merging controller facilitates starting of merging control of the host vehicle when it is detected that a traffic volume of the main lane by the second detector is equal to or greater than a predetermined amount, and wherein the merging controller facilitates starting of merging control of the host vehicle when it is detected by the second detector that a plurality of other vehicles that are traveling along the main lane are present and the number of the other vehicles that perform lane changing from the first lane adjacent to the merging road is equal to or greater than the number of the other vehicles that do not perform lane changing from the first lane, in comparison with a case in which it is detected by the second detector that a plurality of the other vehicles that are traveling along the main lane are not present or the number of the other vehicles that perform lane changing from the first lane adjacent to the merging road is less than the number of the other vehicles that do not perform lane changing from the first lane.

4. The vehicle controller according to claim 3, wherein the merging controller facilitates starting of merging control of the host vehicle further when a traffic volume of the second lane far from the merging road and adjacent to the first lane is less than a predetermined amount in comparison with a case in which the traffic volume of the second lane is equal to or greater than the predetermined amount.

5. A vehicle control method performed by a computer, the vehicle control method comprising:

detecting a traveling state of a host vehicle;

detecting:
a traveling state of another vehicle that travels along a main lane when the host vehicle travels along a merging road, and
a traffic volume of the main lane;

controlling merging of the host vehicle regardless of a lane changing of the other vehicle, when a distance in a forward/rearward direction of the host vehicle with respect to the other vehicle is equal to or greater than a predetermined amount; and facilitating starting of merging control of the host vehicle when:
it is detected, by the second detector, that a traffic volume of the main lane is equal to or greater than a predetermined amount,
the main lane comprises a plurality of lanes, and
a traffic volume of a first lane of the main lane adjacent to the merging road and a second lane of the main lane adjacent to the first lane is equal to or greater than a predetermined amount in comparison with a first case in which the traffic volume of the first lane is less than a predetermined amount.

* * * * *